J. CORWIN.
ANTISKIDDING TIRE.
APPLICATION FILED FEB. 13, 1909.
955,634.
Patented Apr. 19, 1910.
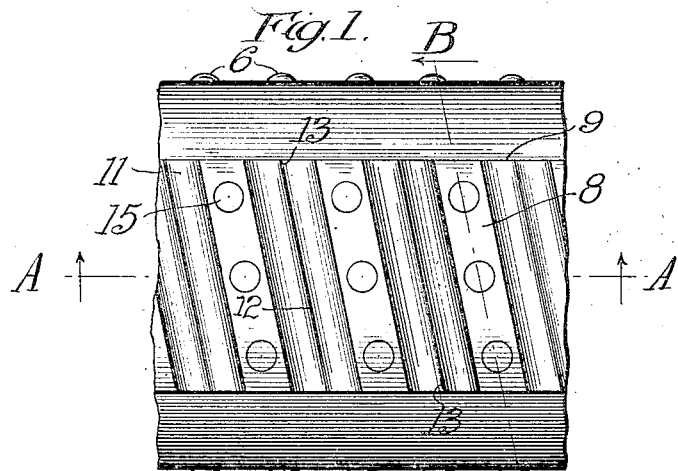
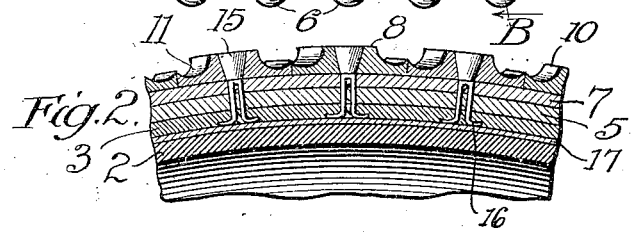
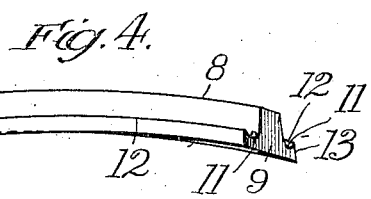
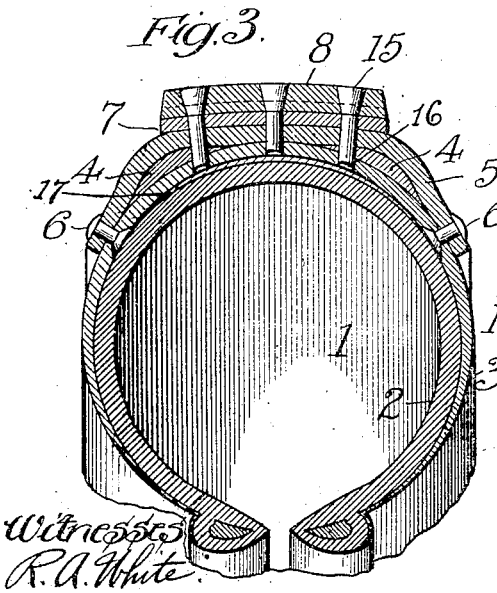
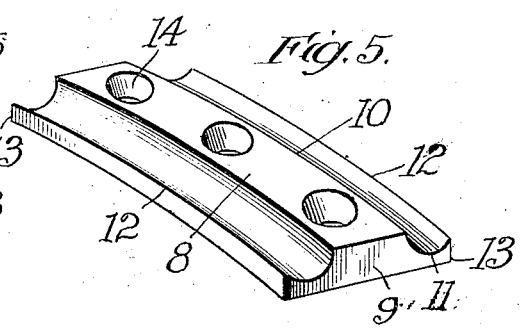
Witnesses
R. A. White
H. R. Levine
Inventor
John Corwin
By W. W. Witherbury, Atty.

UNITED STATES PATENT OFFICE.

JOHN CORWIN, OF CHICAGO, ILLINOIS.

ANTISKIDDING-TIRE.

955,634.

Specification of Letters Patent. Patented Apr. 19, 1910.

Application filed February 13, 1909. Serial No. 477,581.

*To all whom it may concern:-*

Be it known that I, JOHN CORWIN, a citizen of the United States, and residing at Chicago, in the county of Cook and State of Illinois, have invented a new and useful Improvement in Antiskidding-Tires, of which the following is a complete specification.

This invention relates to improvements in antiskidding tires and more particularly to the tread therefor.

The main objects of the invention are to provide a tire tread which will prevent the tire from skidding and will also afford a nonpuncturable tread surface without decreasing the resiliency of the tire.

The invention consists of the matters hereinafter described in the specification and more fully pointed out and defined in the appended claim.

In the drawings: Figure 1 is a fragmentary plan view of a tire provided with a tread embodying this invention. Fig. 2 is a section taken on line A—A of Fig. 1. Fig. 3 is a section taken on line B—B of Fig. 1. Fig. 4 is a side elevation of one of the tread plates. Fig. 5 is a perspective view of the same.

As shown in said drawings, a tire body 1 is provided which may be of any preferred construction, but which, as herein shown, comprises a rubber tire carcass 2 and a leather casing or covering 3, securely cemented thereon. Extending along the greater or longitudinal circumference of said casing, and on each side of the center thereof, is a shoulder 4 adapted to reduce the transverse curvature of the tire. Said shoulders may be formed in any preferred manner, but, as herein shown, each is formed of a strip of leather cemented to the casing and having its outer surface beveled down at the edges to the desired form. A protecting strip 5, of leather or other suitable material, extends longitudinally around the casing and is cemented thereto and to said shoulders, and its edges project laterally beyond the shoulders and are riveted to the casing 3 by means of rivets 6. As shown a tread strip 7, of leather or other preferred material, extends longitudinally around the tire body and serves to provide additional strength at the tread portion of the tire, though obviously said strip may be dispensed with if preferred. On the structure thus formed are secured the tread plates 8, which may be of any desired material, but preferably are formed of a tough grade of steel having good wearing qualities. Said plates, as shown more clearly in Fig. 1, extend diagonally across the tire and have their ends 9 parallel with the longitudinal axis of the tire. Each plate comprises a central tread portion 10, which extends longitudinally thereof, and laterally disposed protecting flanges 11, which are adapted to overlap the intervening space between the tread portions 10 of adjacent plates. Said plates are placed near enough together on the tread strip 7 to prevent a nail or like object from entering the joint between the same but not close enough for them to bind together when the tread surface is depressed. Each of said flanges increases in thickness toward its lateral margin to provide a deflecting rib 12 adapted to deflect nails or other objects from the joint should they strike the flange.

The upper surface of each plate is slightly curved longitudinally thereof so that the ends will not wear more rapidly than the central portion, and the under surface of the plate is curved on the arc of a circle intersecting the long corners 13 of the plate, so that said surface has a somewhat spiral form, as shown in Fig. 4, to enable it to conform both to the transverse and the longitudinal curvature of the tire. Said plates may be secured to the tire body in any preferred manner, but, as shown, they are provided with three tapering apertures 14, and split rivets 15 are inserted therethrough and through the tread strip 7, protecting strip 5 and casing 3, and their inner ends 16 are clenched transversely of the plates, as shown in Fig. 2. A strip of leather or other suitable material 17 is cemented to the inner surface of the casing and covers the inner ends of said rivets and protects the carcass therefrom.

When the tire is in operation the tread portions 8 of the plates contact with the road surface, and owing to the fact that they are diagonal to the longitudinal curvature of the tire they prevent the tire from skidding. Furthermore owing to the fact that the outer surfaces of the plates are curved longitudinally the wear is distributed evenly over the same and there is no jar while the weight is passing from one plate to the other, and since the plates are attached to the tire along their medial line, the flanges may yield slightly with respect to the tire body when they strike an object.

Should a nail or other sharp object strike the flanges 11 it will be deflected from the joints between the plates by means of the ribs 12.

Obviously a tire provided with tread plates embodying this invention will not skid and the danger of puncture through the tread surface is entirely eliminated. Obviously also many details of form and construction may be varied without departing from the principles of this invention.

I claim as my invention:

The combination with a tire body of a plurality of tread plates arranged diagonally across the tread surface thereof and lying closely together, each of said plates having a rib extending the full length of each lateral margin, and a centrally disposed tread portion extending parallel with said ribs and of a greater height, said ribs and tread portion providing a pair of parallel channels in the plate which open from the ends of the plate.

In testimony whereof I have hereunto subscribed my name in the presence of two witnesses.

JOHN CORWIN.

Witnesses:
W. W. WITHENBURY,
FRED S. VAUGHN.